(12) United States Patent
Li

(10) Patent No.: US 11,948,524 B2
(45) Date of Patent: Apr. 2, 2024

(54) LOGIC CIRCUIT AND DISPLAY PANEL

(71) Applicant: TCL CHINA STAR OPTOELECTRONICS TECHNOLOGY CO., LTD., Guangdong (CN)

(72) Inventor: Wenfang Li, Guangdong (CN)

(73) Assignee: TCL CHINA STAR OPTOELECTRONICS TECHNOLOGY CO., LTD., Guangdong (CN)

(*) Notice: Subject to any disclaimer, the term of this patent is extended or adjusted under 35 U.S.C. 154(b) by 0 days.

(21) Appl. No.: 17/594,025

(22) PCT Filed: Jul. 23, 2021

(86) PCT No.: PCT/CN2021/108090
§ 371 (c)(1),
(2) Date: Sep. 30, 2021

(87) PCT Pub. No.: WO2023/283993
PCT Pub. Date: Jan. 19, 2023

(65) Prior Publication Data
US 2024/0046894 A1 Feb. 8, 2024

(30) Foreign Application Priority Data
Jul. 15, 2021 (CN) .......................... 202110800304.6

(51) Int. Cl.
*G09G 3/36* (2006.01)
*H02M 1/44* (2007.01)
*H02M 3/156* (2006.01)

(52) U.S. Cl.
CPC ................ *G09G 3/36* (2013.01); *H02M 1/44* (2013.01); *H02M 3/156* (2013.01); *G09G 2330/021* (2013.01); *G09G 2330/06* (2013.01)

(58) Field of Classification Search
CPC ............... G09G 3/36; G09G 2330/021; G09G 2330/06; H02M 1/44; H02M 3/156
(Continued)

(56) References Cited

U.S. PATENT DOCUMENTS 10,614,766 B2* 4/2020 Luo ...................... G09G 3/3611
11,029,545 B2* 6/2021 Li ......................... G02F 1/1368
(Continued)

FOREIGN PATENT DOCUMENTS

CN 103440848 A 12/2013
CN 108539973 A 9/2018
(Continued)

*Primary Examiner* — Tom V Sheng

(57) ABSTRACT

The present application provides a logic circuit and a display panel. One end of a switching control module of the logic circuit is connected in series with a voltage adjusting control module, and another end of the switching control module is connected in series with a switch component of a voltage adjusting module. Also, the switching control module connected in series with the same switch component has at least two different operational currents for a corresponding switch component to have different switching speeds for alleviating the problem of excessive electromagnetic interference (EMI) occurred in a power management chip of existing LCD products.

20 Claims, 2 Drawing Sheets

(58) Field of Classification Search
USPC .......................................................... 345/212
See application file for complete search history.

(56) References Cited

U.S. PATENT DOCUMENTS

| | | | |
|---|---|---|---|
| 11,632,046 B2* | 4/2023 | Kim ...................... | H02M 3/156 |
| | | | 323/282 |
| 2002/0093475 A1* | 7/2002 | Hashimoto .......... | G09G 3/3696 |
| | | | 345/87 |
| 2006/0061532 A1* | 3/2006 | Hashimoto .......... | G09G 3/3696 |
| | | | 345/89 |
| 2010/0001702 A1 | 1/2010 | Tateishi | |
| 2011/0157129 A1* | 6/2011 | Song .................... | G09G 3/3685 |
| | | | 345/87 |
| 2016/0118875 A1* | 4/2016 | Lee ...................... | G09G 3/3696 |
| | | | 345/212 |
| 2018/0019675 A1* | 1/2018 | Chemisky ............ | H02M 3/1582 |
| 2018/0219477 A1* | 8/2018 | Ji .............................. | G09G 3/36 |
| 2019/0027103 A1* | 1/2019 | Zhang .................... | H02M 3/156 |
| 2021/0119536 A1* | 4/2021 | Zhang ................. | H02M 3/1566 |

FOREIGN PATENT DOCUMENTS

| | | |
|---|---|---|
| CN | 111817563 A | 10/2020 |
| CN | 112152431 A | 12/2020 |
| GB | 2508129 A | 10/2012 |
| JP | 2008210537 A | 9/2008 |

\* cited by examiner

LOGIC CIRCUIT AND DISPLAY PANEL

FIELD OF THE DISCLOSURE

The present application relates to display technologies, and more particularly to a logic circuit and a display panel.

DESCRIPTION OF RELATED ARTS

Liquid crystal display (LCD) products, such as LCD TVs, smartphones, digital cameras, tablets, computer screens, laptop screens, etc., have many advantages including thin body, power-saving, free of radiation, etc., have been widely used, and dominate in the field of flat panel displays.

For the LCD products, electromagnetic interference (EMI) specification is an important indicator for evaluating radiation influence of the LCD products on human body. Therefore, the EMI specification of the LCD products has to meet a certain standard to be able to be put on the market. There are many factors that may cause EMI, such as various integrated circuit (IC) chips in the LCD products, including power management integrated circuits (PMICs), timing control chips, data driving chips, etc. Among them, the EMI of the power management chip is related to the switching speed of a boost module or a buck module. However, all topologies in current power management chips have same switching speed such that it is easy for the power management chips to have excessive EMI.

Therefore, it needs to solve the problem of excessive EMI occurred in the power management chips of existing LCD products.

SUMMARY

Technical Problems

The present application provides a logic circuit and a display panel, for alleviating the problem of excessive electromagnetic interference (EMI) occurred in a power management chip of existing LCD products.

Technical Solutions

To solve above problems, the technical solutions provided in the present application are described below.

The present application provides a logic circuit, which includes:
  a voltage adjusting control module;
  a switching control module, one end of the switching control module connected in series with the voltage adjusting control module;
  a voltage adjusting module, including a switch component, another end of the switching control module connected in series with the switch component,
  wherein the switching control module connected in series with the same switch component has at least two different operational currents for a corresponding switch component to have different switching speeds.

In the logic circuit provided in an embodiment of the present application, the switching control module connected in series with the same switch component includes at least two current sources connected in parallel to each other, one end of each current source is connected to the voltage adjusting control module via a control switch, and another end of each current source is connected to a corresponding switch component, wherein the operational currents of the current sources are different from each other.

In the logic circuit provided in an embodiment of the present application, the voltage adjusting control module includes a boost control module, the switching control module connected to the boost control module is a first switching control module, the switch component connected to the first switching control module is a first switch component, wherein the first switching control module includes:
  a first current source, one end of the first current source connected to the boost control module via a first control switch, another end of the first current source connected to a first end of the first switch component;
  a second current source, one end of the second current source connected to the boost control module via a second control switch, another end of the second current source connected to the first end of the first switch component,
  wherein the operational currents of the first current source and the second current source are different from each other.

In the logic circuit provided in an embodiment of the present application, the voltage adjusting module corresponding to the first switch component is a boost module, the boost module has a first voltage input end and a first voltage output end, and the boost module includes:
  a first inductor, one end of the first inductor connected to the first voltage input end, the other end of the first inductor connected to a second end of the first switch component, a third end of the first switch component being grounded;
  a diode, a positive electrode of the diode connected to the other end of the first inductor, a negative electrode of the diode connected to the first voltage output end;
  a first capacitor, a first electrode plate of the first capacitor connected to the negative electrode of the diode, a second electrode plate of the first capacitor being grounded.

In the logic circuit provided in an embodiment of the present application, the first switching control module further includes:
  a third current source, one end of the third current source connected to the boost control module via a third control switch, another end of the third current source connected to the first end of the first switch component,
  wherein the operational current of the third current source is different from the operational currents of both the first current source and the second current source.

In the logic circuit provided in an embodiment of the present application, the voltage adjusting control module includes a buck control module, the switching control module connected to the buck control module includes a second switching control module and a third switching control module, the switch component connected to the second switching control module is a second switch component, the switch component connected to the third switching control module is a third switch component, wherein the second switching control module includes:
  a fourth current source, one end of the fourth current source connected to the buck control module via a fourth control switch, another end of the fourth current source connected to the first end of the second switch component;
  a fifth current source, one end of the fifth current source connected to the buck control module via a fifth control switch, another end of the fifth current source connected to the first end of the second switch component, wherein the operational currents of the fourth current source and the fifth current source are different from each other.

In the logic circuit provided in an embodiment of the present application, the second switching control module further includes:

a sixth current source, one end of the sixth current source connected to the buck control module via a sixth control switch, another end of the sixth current source connected to the first end of the second switch component, wherein the operational current of the sixth current source is different from the operational currents of both the fourth current source and the fifth current source.

In the logic circuit provided in an embodiment of the present application, the third switching control module further includes:

a seventh current source, one end of the seventh current source connected to the buck control module via a seventh control switch, another end of the seventh current source connected to the first end of the third switch component;

an eighth current source, one end of the eighth current source connected to the buck control module via an eighth control switch, another end of the eighth current source connected to the first end of the third switch component, wherein the operational currents of the seventh current source and the eighth current source are different from each other.

In the logic circuit provided in an embodiment of the present application, the third switching control module further includes:

a ninth current source, one end of the ninth current source connected to the buck control module via a ninth control switch, another end of the ninth current source connected to the first end of the third switch component, wherein the operational current of the ninth current source is different from the operational currents of both the seventh current source and the eighth current source.

In the logic circuit provided in an embodiment of the present application, the voltage adjusting module corresponding to the third switch component and the fourth switch component is a buck module, the buck module has a second voltage input end and a second voltage output end, and the buck module includes:

a second inductor, one end of the second inductor connected to the third end of the second switch component and the second end of the third switch component, the other end of the second inductor connected to the second voltage output end, and the second end of the second switch component connected to the second voltage input end, the third end of the third switch component being grounded;

a second capacitor, a first electrode plate of the second capacitor connected to the other end of the second inductor, a second electrode plate of the second capacitor being grounded.

An embodiment of the present application further provides a display panel, which includes the logic circuit of any of afore-described embodiments.

Beneficial Effects

In the logic circuit and the display panel provided in the present application, the logic circuit includes the voltage adjusting control module, the switching control module and the voltage adjusting module. One end of the switching control module is connected in series with the voltage adjusting control module, and another end of the switching control module is connected in series with the switch component of the voltage adjusting module. Also, the switching control module connected in series with the same switch component has at least two different operational currents for a corresponding switch component to have different switching speeds. The different switching speeds can make EMI of the logic circuit dispersed effectively such that energy is not accumulated, thereby reducing the EMI and solving the problem of excessive EMI occurred in a power management chip of existing LCD products.

DESCRIPTION OF DRAWINGS

For explaining the technical solutions used in the existing arts or the embodiments more clearly, the appended figures to be used in describing the existing arts or the embodiments will be briefly introduced in the following. Obviously, the appended figures described below are only some of the embodiments of the invention, and those of ordinary skill in the art can further obtain other figures according to these figures without making any inventive effort.

DESCRIPTION OF EMBODIMENTS OF THE DISCLOSURE

The following descriptions for the respective embodiments are specific embodiments capable of being implemented for illustrations of the present application with referring to the appended figures. In describing the present application, spatially relative terms such as "upper", "lower", "front", "back", "left", "right", "inner", "outer", "lateral", and the like, may be used herein for ease of description as illustrated in the figures. Therefore, the spatially relative terms used herein are intended to illustrate the present application for ease of understanding, but are not intended to limit the present application. In the appended figures, units with similar structures are indicated by same reference numbers. In the appended figures, the thickness of some layers and regions are exaggerated for ease of description and understanding clearly. That is, the size and thickness of each component shown in the figures are arbitrarily illustrated, but the present application is not limited thereto.

Figure 1:
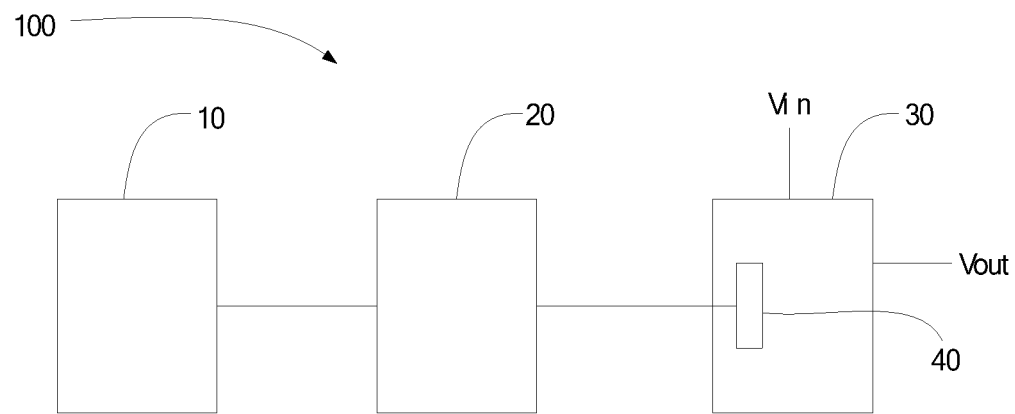
FIG. 1 is a schematic diagram showing a framework of a logic circuit provided in an embodiment of the present application.
Figure 2:
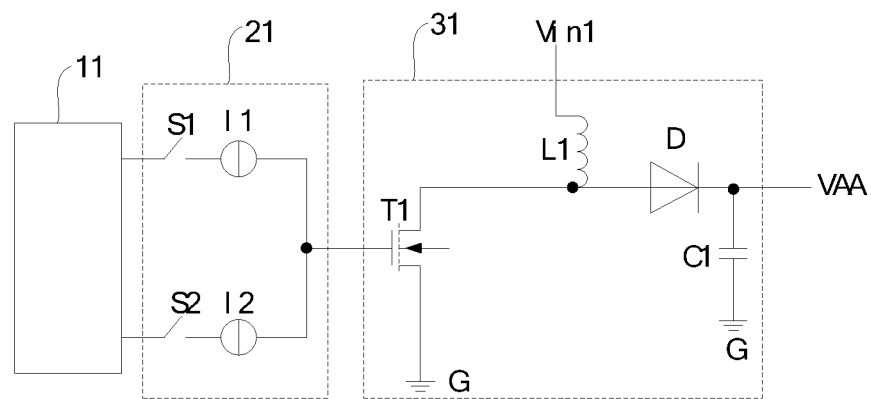
FIG. 2 is a schematic diagram showing a type of circuit structure of a logic circuit provided in an embodiment of the present application.

Please refer to FIG. 1 and FIG. 2 together. FIG. 1 is a schematic diagram showing a framework of a logic circuit provided in an embodiment of the present application. FIG.

2 is a schematic diagram showing a type of circuit structure of a logic circuit provided in an embodiment of the present application. The logic circuit 100 includes a voltage adjusting control module 10, a switching control module 20 and a voltage adjusting module 30. One end of the switching control module 20 is connected in series with the voltage adjusting control module 10. The voltage adjusting module 30 includes a switch component 40, and another end of the switching control module 20 is connected in series with the switch component 40. The switching control module 20 connected in series with the same switch component 40 has at least two different operational currents for a corresponding switch component 40 to have different switching speeds.

Specifically, the voltage adjusting control module 10 is configured to control the switching control module 20 to periodically output different operational currents. The different operational currents can make the switch component 40 have different switching speeds. The different switching speeds can help disperse electromagnetic interference (EMI) of the logic circuit 100 effectively. In such a way, energy is not accumulated, reducing the EMI of the logic circuit 100.

The voltage adjusting module 30 further includes a voltage input end Vin and a voltage output end Vout. By periodically turning on and turning off the switch component 40, the voltage adjusting module 30 is configured to increase or decrease the voltage of the voltage input end Vin and output the increased or decreased voltage via the voltage output end Vout, thereby realizing the boost and/or buck function of the logic circuit.

The structure and operational principle of the logic circuit 100 will be described in details below by taking the boost function of the logic circuit 100 as an example:

Please continue referring to FIG. 1 and FIG. 2 together. The voltage adjusting module 30 of the logic circuit 100 is a boost module 31, and correspondingly, the voltage adjusting control module 10 is a boost control module 11. The switching control module 20 connected to the boost control module 11 is a first switching control module 21, the switch component 40 connected to the first switching control module 21 is a first switch component T1, and the first switch component T1 is located inside the boost module 31. The first switching control module 21 connected in series with the first switch component T1 includes at least two current sources connected in parallel to each other, one end of each current source is connected to the voltage adjusting control module 11 via a control switch, and another end of each current source is connected to the first switch component T1, wherein the operational currents of the current sources are different from each other. The current sources may provide constant electric currents. The operational current of each current source is thus the constant electric current provided by a corresponding current source. The constant electric currents can control the switching speed of the switch component 40.

Optionally, the first switch component T1 includes a semiconductor switch device such as a field-effect thin-film transistor. When the first switch component T1 is a field-effect transistor, the first switch component T1 has a first end, a second end and a third end, wherein the first end is a gate, the second end is a source, and the third end is a drain. The second end and the third end can conduct electricity by controlling the voltage of the first end.

Specifically, the first switching control module 21 includes a first current source I1 and a second current source I2. One end of the first current source I1 is connected to the boost control module 11 via a first control switch S1, and another end of the first current source I1 is connected to the first end of the first switch component T1. One end of the second current source I2 is connected to the boost control module 11 via a second control switch S2, and another end of the second current source I2 is connected to the first end of the first switch component T1. The operational currents of the first current source I1 and the second current source I2 are different from each other. The different operational currents allow the first switch component T1 to have different switching speeds. The different switching speeds allows the EMI of the logic circuit to be effectively dispersed. In such a way, energy is not accumulated, reducing the EMI of the logic circuit.

By the first switching control module 21, the boost control module 11 controls the first switch component T1 to be turned on and off periodically. Each current source in the first switching control module 21 controls the switching speed of the first switch component T1. Turning on and off the first switch component T1 makes the boost module 31 increase the voltage of a first voltage input end Vin1, which is then outputted via a first voltage output end VAA.

The boost module 31 includes a first inductor L1, a diode D and a first capacitor C1. One end of the first inductor L1 is connected to the first voltage input end Vin1, and the other end of the first inductor L1 is connected to the second end of the first switch component T1. The third end of the first switch component T1 is grounded. The positive electrode of the diode D is connected to the other end of the first inductor L1, and the negative electrode of the diode D is connected to the first voltage output end VAA. A first electrode plate of the first capacitor C1 is connected to the negative electrode of the diode D, and a second electrode plate of the first capacitor C1 is grounded. The first capacitor C1 can make the output voltage of the first voltage output end VAA stable.

Optionally, the diode D includes a Schottky diode, which has a low forward voltage drop and an extremely short reverse recovery time. In the boost module 31, the diode D can pass the voltage increased by the boost module 31 and prevent reverse current flow.

Figure 3:
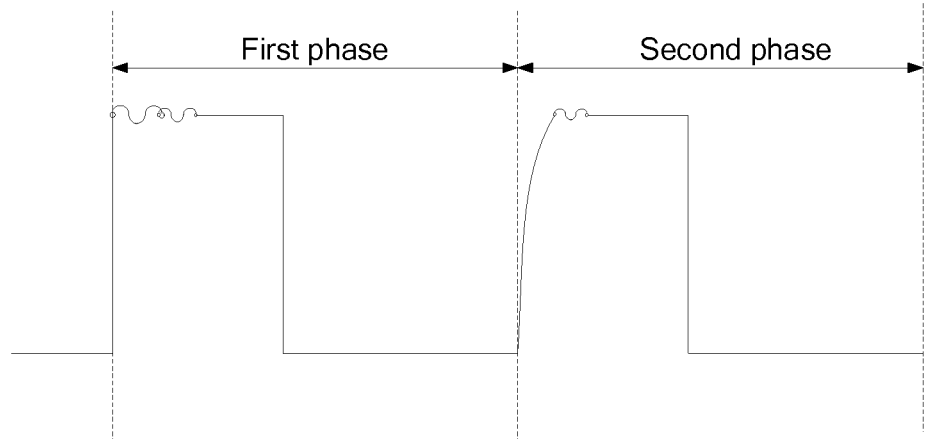
FIG. 3 is a waveform diagram of switch signals of a switch component provided in an embodiment of the present application.

Next, the operational principle of the boost module 31 will be described with reference to FIGS. 1 to 3. FIG. 3 is a waveform diagram of switch signals of a switch component provided in an embodiment of the present application. Since the first switching control module 21 includes the first current source I1 and the second current source I2, the operational processes of the boost module 31 may be divided into a first phase and a second phase. The first current source I1 works in the first phase, and the second current source I2 works in the second phase. In the present embodiment, the operational phases of the boost module 31 are illustrated by taking 150 cycles for example. The first phase is under the 1st to the 75th cycles, and the second phase is under the 76th to the 150th cycles. Each phase includes 75 cycles. Of course, the number of cycles of the first phase and the number of cycles of the second phase may not be equal to each other.

The first phase: the boost control module 11 controls the first control switch S1 to be turned on such that a conductive path is formed between the boost control module 11 and the first switch component T1 for controlling the first switch component T1 to be turned on. Meanwhile, turning on the first control switch S1 further makes the first current source I1 output the operational current to the first switch component T1 so as to control the switching speed of the first switch component T1, making the first switch component T1 operate at a first switching speed. When the first switch component T1 is turned on, a conductive path is formed among the first voltage input end Vin1, the first inductor L1, the first switch component T1 and the ground G, and the first voltage input end Vin1 charges the first inductor L1 by electricity.

After the charging of the first inductor L1 is finished, the boost control module 11 controls the first control switch S1 to be turned off such that an open loop is formed between the boost control module 11 and the first switch component T1, thereby making the first switch component T1 turned off. The first voltage input end Vin1 stop charging the first inductor L1. The first inductor L1 outputs a voltage to the first voltage output end VAA via the diode D. The output voltage of the first voltage output end VAA is greater than the input voltage of the first voltage input end Vin1, and the magnitude of the output voltage of the first voltage output end VAA is related to the magnitude of the input voltage of the first voltage input end Vin1 and the positive duty ratio for turning on and off the first switch component T1. For example, the input voltage of the first voltage input end Vin1 is 12V, and then the output voltage of the first voltage output end VAA is 14V to 17V. Also, the first inductor L1 further charges the first capacitor C1 by electricity via the diode D such that the first voltage output end VAA of the boost module 31 can output a stable output voltage.

As a result, the first switch component T1 is turned on and off at the first switching speed based on an inherent frequency and the processes are cycled based on a predetermined period such that the boost module 31 rises up the voltage of the first voltage input end Vin1 and then outputs it via the first voltage output end VAA. The inherent frequency depends on the output voltage that the boost module 31 actually needs to output, and the predetermined period thus corresponds to the number of periods of the first phase.

The second phase: the boost control module 11 controls the second control switch S2 to be turned on such that a conductive path is formed between the boost control module 11 and the first switch component T1 for controlling the first switch component T1 to be turned on. Meanwhile, turning on the second control switch S2 further makes the second current source I2 output the operational current to the first switch component T1 so as to control the switching speed of the first switch component T1, making the first switch component T1 operate at a second switching speed. When the first switch component T1 is turned on, a conductive path is formed among the first voltage input end Vin1, the first inductor L1, the first switch component T1 and the ground G, and the first voltage input end Vin1 charges the first inductor L1 by electricity.

After the charging of the first inductor L1 is finished, the boost control module 11 controls the second control switch S2 to be turned off such that an open loop is formed between the boost control module 11 and the first switch component T1, thereby making the first switch component T1 turned off. The first inductor L1 outputs a voltage to the first voltage output end VAA via the diode D and charges the first capacitor C1 by electricity via the diode D. The operational process of the second phase may be referred to the descriptions on the first phase, and is not repeated herein.

In the present embodiment, the first current source I1 and the second current source I2 of the first switching control module 21 have different operational currents. Also, the first current source I1 works at the first phase such that the first switch component T1 operates at the first switching speed, and the second current source I2 works at the second phase such that the first switch component T1 operates at the second switching speed. Since the first switch component T1 operates at different switching speeds, waveform diagram formed by switching signals of the first switch component T1 in the first phase and the second phase have different waveform frequencies and magnitudes. This can effectively disperse the EMI of the logic circuit such that energy is not accumulated, reducing the EMI of the logic circuit.

Figure 4:
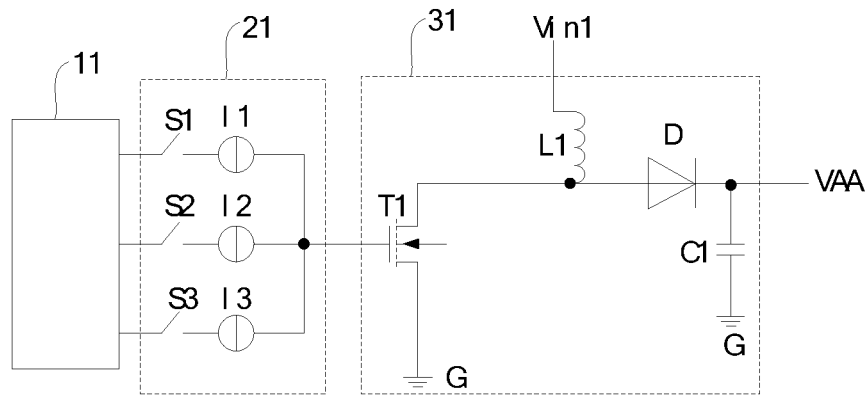
FIG. 4 is a schematic diagram showing another type of circuit structure of a logic circuit provided in an embodiment of the present application.
Figure 5:
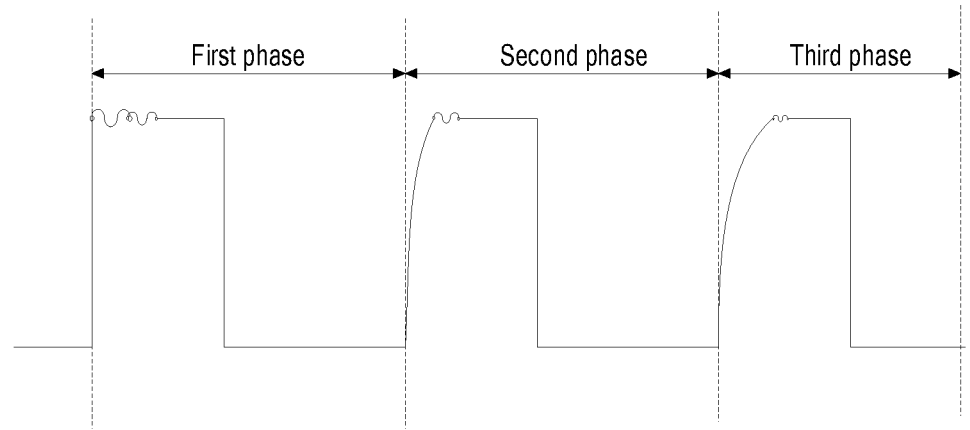
FIG. 5 is another waveform diagram of switch signals of a switch component provided in an embodiment of the present application.

Please refer to FIG. 4 and FIG. 5. In an embodiment, FIG. 4 is a schematic diagram showing another type of circuit structure of a logic circuit provided in an embodiment of the present application, and FIG. 5 is another waveform diagram of switch signals of a switch component provided in an embodiment of the present application. Different from above embodiment, the first switching control module 21 further includes a third current source I3. One end of the third current source I3 is connected to the boost control module 11 via a third control switch S3, and another end of the third current source I3 is connected to the first end of the first switch component T1. The operational current of the third current source I3 is different from the operational currents of both the first current source I1 and the second current source I2.

Since the first switching control module 21 includes the first current source I1, the second current source I2 and the third current source I3, the operational processes of the boost module 31 may be divided into a first phase, a second phase and a third phase. The first current source I1 works in the first phase, the second current source I2 works in the second phase, and the third current source I3 works in the third phase. In the present embodiment, the operational phases of the boost module 31 are still illustrated by taking 150 cycles for example. The first phase is under the 1st to the 50th cycles, the second phase is under the 51th to the 100th cycles, and the third phase is under the 101st to the 150th cycles. Each phase includes 50 cycles. The operational processes of the first phase and the second phase are as the same as above embodiment. In the third phase, the first switch component T1 has a third switching speed. The operational process of the third phase may be referred to that of the first phase and the second phase.

The first current source I1, the second current source I2 and the third current source I3 of the first switching control module 21 have different operational currents. Also, the first current source I1 works at the first phase such that the first switch component T1 operates at the first switching speed, the second current source I2 works at the second phase such that the first switch component T1 operates at the second switching speed, and the third current source I3 works at the third phase such that the first switch component T1 operates at the third switching speed. Since the first switch component T1 operates at different switching speeds, waveform diagram formed by switching signals of the first switch component T1 in the first phase, the second phase and the third phase have different waveform frequencies and magnitudes. This can effectively disperse the EMI of the logic circuit such that energy is not accumulated, reducing the EMI of the logic circuit. Since the first switch component T1 have more different switching speeds such that there is more room to improve the EMI of the logic circuit, that is, the EMI of the logic circuit can be further reduced. Please refer to above embodiment for other details, which are not repeated herein.

Figure 6:
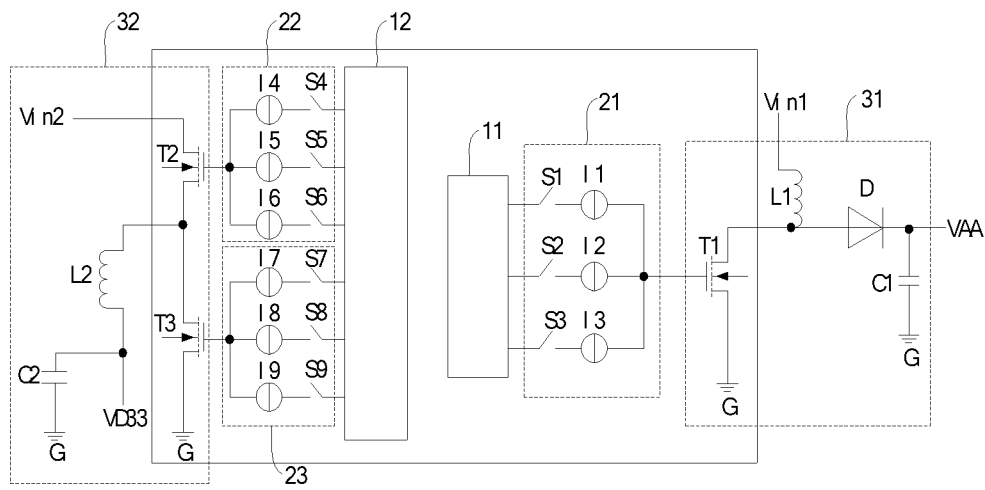
FIG. 6 is a schematic diagram showing still another type of circuit structure of a logic circuit provided in an embodiment of the present application.

Please refer to FIGS. 1 to 6. In an embodiment, FIG. 6 is a schematic diagram showing still another type of circuit structure of a logic circuit provided in an embodiment of the present application. Different from above embodiments, the voltage adjusting control module 10 further includes a buck control module 12, and correspondingly, the switching control module 20 connected to the buck control module 12 includes a second switching control module 22 and a third switching control module 23. The switch component 40 connected to the second switching control module 22 is a second switch component T2, and the switch component 40 connected to the third switching control module 23 is a third switch component T3. The voltage adjusting module 30 corresponding to the third switch component T3 and the fourth switch component T4 is a buck module 32. The buck module 32 has a second voltage input end Vin2 and a second voltage output end VD33.

Optionally, the second switch component T2 and the third switch component T3 may be of a type as the same as the first switch component T1. Each of the second switch component T2 and the third switch component T3 has a first end, a second end and a third end, wherein the first end is a gate, the second end is a source, and the third end is a drain. The second end and the third end can conduct electricity by controlling the voltage of the first end.

Specifically, the second switching control module 22 includes a fourth current source I4, a fifth current source I5 and a sixth current source I6. The operational currents of the fourth current source I4, the fifth current source I5 and the sixth current source I6 are different from one another. One end of the fourth current source I4 is connected to the buck control module 12 via a fourth control switch S4, and another end of the fourth current source I4 is connected to the first end of the second switch component T2. One end of the fifth current source I5 is connected to the buck control module 12 via a fifth control switch S5, and another end of the fifth current source I5 is connected to the first end of the second switch component T2. One end of the sixth current source I6 is connected to the buck control module 12 via a sixth control switch S6, and another end of the sixth current source I6 is connected to the first end of the second switch component T2.

The third switching control module 23 includes a seventh current source I7, an eighth current source I8 and a ninth current source I9. The operational currents of the seventh current source I7, the eighth current source I8 and the ninth current source I9 are different from one another. One end of the seventh current source I7 is connected to the buck control module 12 via a seventh control switch S7, and another end of the seventh current source I7 is connected to the first end of the third switch component T3. One end of the eighth current source I8 is connected to the buck control module 12 via an eighth control switch S8, and another end of the eighth current source I8 is connected to the first end of the third switch component T3. One end of the ninth current source I9 is connected to the buck control module 12 via a ninth control switch S9, and another end of the ninth current source I9 is connected to the first end of the third switch component T3.

Since the operational currents of the current sources in the second switching control module 22 and the third switching control module 23 are different from one another, the different operational currents make the second switch component T2 and the third switch component T3 have different switching speeds. The different switching speeds allows the EMI of the logic circuit to be effectively dispersed. In such a way, energy is not accumulated, reducing the EMI of the logic circuit.

By the second switching control module 22 and the third switching control module 23, the buck control module 12 controls the second switch component T2 and the third switch component T3, respectively, to be turned on and off periodically. The current sources in the second switching control module 22 and the third switching control module 23 control the switching speeds of the second switch component T2 and the third switch component T3, respectively. Turning on and off the second switch component T2 and the third switch component T3 makes the buck module 32 decrease the voltage of the second voltage input end Vin2, which is then outputted via the second voltage output end VD33.

The buck module 32 includes a second inductor L2 and a second capacitor C2. One end of the second inductor L2 is connected to the third end of the second switch component T2 and the second end of the third switch component T3, and the other end of the second inductor L2 is connected to the second voltage output end VD33. The second end of the second switch component T2 is connected to the second voltage input end Vin2, and the third end of the third switch component T3 is grounded. A first electrode plate of the second capacitor C2 is connected to the other end of the second inductor L2, and a second electrode plate of the second capacitor C2 is grounded.

The operational principle of the buck module 32 is described as follows:

Since each of the second switching control module 22 and the third switching control module 23 includes three current sources having different operational currents, the operational processes of the buck module 32 may be divided into a first phase, a second phase and a third phase. The fourth current source I4 and the seventh current source I7 work in the first phase, the fifth current source I5 and the eighth current I8 work in the second phase, and the sixth current source I6 and the ninth current source I9 work in the third phase. In the present embodiment, the operational phases of the buck module 32 are also illustrated by taking 150 cycles for example. The first phase is under the 1st to the 50th cycles, the second phase is under the 51th to the 100th cycles, and the third phase is under the 101st to the 150th cycles. Each phase includes 50 cycles. Of course, the number of cycles of each phase may not be equal to each other. Also, the current sources operated in each phase may not be as the same as that illustrated in the present embodiment. For example, the current sources operated in the first phase can also be the fourth current source I4 and the eighth current source I8.

The first phase: the buck control module 12 controls the fourth control switch S4 to be turned on such that a conductive path is formed between the buck control module 12 and the second switch component T2 for controlling the second switch component T2 to be turned on. Meanwhile, turning on the fourth control switch S4 further makes the fourth current source I4 output the operational current to the second switch component T2 so as to control the switching speed of the second switch component T2, making the second switch component T2 operate at a first switching speed. When the second switch component T2 is turned on, the second voltage input end Vin2 charges the second inductor L2 by electricity.

After the charging of the second inductor L2 is finished, the buck control module 12 controls the fourth control switch S4 to be turned off such that an open loop is formed between the buck control module 12 and the second switch component T2, thereby making the second switch component T2 turned off. Meanwhile, the buck control module 12 controls the seventh control switch S7 to be turned on for controlling the third switch component T3 to be turned on. Also, turning on the seventh control switch S7 further makes the seventh current source I7 output the operational current to the third switch component T3 so as to control the switching speed of the third switch component T3, making the third switch component T3 operate at a first switching speed. The first switching speed of the second switch component T2 may be different from the first switching speed of the third switch component T3.

Turing on the second switch component T2 can adjust the voltages of two ends of the second inductor L2 such that the second inductor L2 outputs to the second voltage output end VD33 based on a predetermined voltage. The predetermined voltage refers to the voltage that the buck module 32 actually needs to output. The output voltage of the second voltage output end VD33 is less than the input voltage of the second voltage input end Vin2. For example, the input voltage of the second voltage input end Vin2 is 12V, and then the output voltage of the second voltage output end VD33 is −3.7V to 3.4V. Also, the second inductor L2 further charges the second capacitor C2 by electricity such that the second voltage output end VD33 of the buck module 32 can output a stable output voltage.

The second phase: the buck control module 12 controls the fifth control switch S5 to be turned on such that a conductive path is formed between the buck control module 12 and the second switch component T2 for controlling the second switch component T2 to be turned on. Meanwhile, turning on the fifth control switch S5 further makes the fifth current source I5 output the operational current to the second switch component T2 so as to control the switching speed of the second switch component T2, making the second switch component T2 operate at a second switching speed. When the second switch component T2 is turned off and the third switch component T3 is turned on, the eighth current source I8 outputs the operational current to the third switch component T3 so as to control the switching speed of the third switch component T3, making the third switch component T3 operate at a second switching speed. Likewise, the second switching speed of the second switch component T2 may be different from the second switching speed of the third switch component T3. The operational process of the second phase may be referred to the descriptions on the first phase, and is not repeated herein.

The third phase: the buck control module 12 controls the sixth control switch S6 to be turned on such that a conductive path is formed between the buck control module 12 and the second switch component T2 for controlling the second switch component T2 to be turned on. Meanwhile, turning on the sixth control switch S6 further makes the sixth current source I6 output the operational current to the second switch component T2 so as to control the switching speed of the second switch component T2, making the second switch component T2 operate at a third switching speed. When the second switch component T2 is turned off and the third switch component T3 is turned on, the ninth current source I9 outputs the operational current to the third switch component T3 so as to control the switching speed of the third switch component T3, making the third switch component T3 operate at a third switching speed. Likewise, the third switching speed of the second switch component T2 may be different from the third switching speed of the third switch component T3. The operational process of the third phase may be referred to the descriptions on the first phase, and is not repeated herein.

In the present embodiment, each of the second switching control module 22 and the third switching control module 23 includes three current sources having different operational currents and the current sources having different operational currents operate in different phases such that the corresponding second switch component T2 and the third switch component T3 have different switching speeds. Since both the second switch component T2 and the third switch component T3 operate at different switching speeds, waveform diagram formed by switching signals of the second switch component T2 and the third switch component T3 in the first phase, the second phase and the third phase have different waveform frequencies and magnitudes. This can effectively disperse the EMI of the logic circuit such that energy is not accumulated, reducing the EMI of the logic circuit. The waveform diagram formed by switching signals of the second switch component T2 and the third switch component T3 may be referred to the waveform diagram formed by switching signals of the first switch component T1. Please refer to above embodiments for other details, which are not repeated herein.

It should be noted that the logic circuit of the present application is not limited to what has been illustrated in above embodiments. The logic circuit of the present application may only include the buck function, and one of the second switching control module 22 and the third switching control module 23 has at least two current sources having different operational currents. This can also achieve the purpose of reducing the EMI of the logic circuit. Alternatively, when the logic circuit has both the boost function and the buck function, the switching control module 20 of one of the boost function and the buck function has current sources having different operational currents. This can also achieve the purpose of reducing the EMI of the logic circuit.

An embodiment of the present application further provides a display panel, which includes the logic circuit of any of afore-described embodiments. The display panel includes a liquid crystal display panel, an organic light emitting diode (OLED) display panel, and so on.

It can be known from above embodiments that:

The present application provides a logic circuit and a display panel. The logic circuit includes the voltage adjusting control module, the switching control module and the voltage adjusting module. One end of the switching control module is connected in series with the voltage adjusting control module, and another end of the switching control module is connected in series with the switch component of the voltage adjusting module. Also, the switching control module connected in series with the same switch component has at least two different operational currents for a corresponding switch component to have different switching speeds. The different switching speeds can make EMI of the logic circuit dispersed effectively such that energy is not accumulated, thereby reducing the EMI and solving the problem of excessive EMI occurred in a power management chip of existing LCD products.

In the above embodiments, different emphasis is placed on respective embodiments, and reference may be made to related depictions in other embodiments for portions not detailed in a certain embodiment.

Hereinbefore, the embodiments of the present application are introduced in detail, the principles and implementations of the embodiments are set forth herein with reference to specific examples, descriptions of the above embodiments are merely served to assist in understanding the technical solutions and essential ideas of the present application. Those having ordinary skill in the art should understand that they still can modify technical solutions recited in the aforesaid embodiments or equivalently replace partial technical features therein; these modifications or substitutions do not make essence of corresponding technical solutions depart from the scope of technical solutions of embodiments of the present application.

The invention claimed is:

1. A logic circuit, comprising:
   a voltage adjusting control module;

a switching control module, one end of the switching control module connected in series with the voltage adjusting control module;

a voltage adjusting module, comprising a switch component, another end of the switching control module connected in series with the switch component, wherein the switching control module connected in series with the same switch component has at least two different operational currents for a corresponding switch component to have different switching speeds.

2. The logic circuit of claim 1, wherein the switching control module connected in series with the same switch component comprises at least two current sources connected in parallel to each other, one end of each current source is connected to the voltage adjusting control module via a control switch, and another end of each current source is connected to a corresponding switch component, wherein the operational currents of the current sources are different from each other.

3. The logic circuit of claim 2, wherein the voltage adjusting control module comprises a boost control module, the switching control module connected to the boost control module is a first switching control module, the switch component connected to the first switching control module is a first switch component, wherein the first switching control module comprises:

a first current source, one end of the first current source connected to the boost control module via a first control switch, another end of the first current source connected to a first end of the first switch component;

a second current source, one end of the second current source connected to the boost control module via a second control switch, another end of the second current source connected to the first end of the first switch component, wherein the operational currents of the first current source and the second current source are different from each other.

4. The logic circuit of claim 3, wherein the voltage adjusting module corresponding to the first switch component is a boost module, the boost module has a first voltage input end and a first voltage output end, and the boost module comprises:

a first inductor, one end of the first inductor connected to the first voltage input end, the other end of the first inductor connected to a second end of the first switch component, a third end of the first switch component being grounded;

a diode, a positive electrode of the diode connected to the other end of the first inductor, a negative electrode of the diode connected to the first voltage output end;

a first capacitor, a first electrode plate of the first capacitor connected to the negative electrode of the diode, a second electrode plate of the first capacitor being grounded.

5. The logic circuit of claim 4, wherein the first switching control module further comprises:

a third current source, one end of the third current source connected to the boost control module via a third control switch, another end of the third current source connected to the first end of the first switch component, wherein the operational current of the third current source is different from the operational currents of both the first current source and the second current source.

6. The logic circuit of claim 5, wherein the voltage adjusting control module comprises a buck control module, the switching control module connected to the buck control module comprises a second switching control module and a third switching control module, the switch component connected to the second switching control module is a second switch component, the switch component connected to the third switching control module is a third switch component, wherein the second switching control module comprises:

a fourth current source, one end of the fourth current source connected to the buck control module via a fourth control switch, another end of the fourth current source connected to the first end of the second switch component;

a fifth current source, one end of the fifth current source connected to the buck control module via a fifth control switch, another end of the fifth current source connected to the first end of the second switch component, wherein the operational currents of the fourth current source and the fifth current source are different from each other.

7. The logic circuit of claim 6, wherein the second switching control module further comprises:

a sixth current source, one end of the sixth current source connected to the buck control module via a sixth control switch, another end of the sixth current source connected to the first end of the second switch component, wherein the operational current of the sixth current source is different from the operational currents of both the fourth current source and the fifth current source.

8. The logic circuit of claim 7, wherein the third switching control module further comprises:

a seventh current source, one end of the seventh current source connected to the buck control module via a seventh control switch, another end of the seventh current source connected to the first end of the third switch component;

an eighth current source, one end of the eighth current source connected to the buck control module via an eighth control switch, another end of the eighth current source connected to the first end of the third switch component, wherein the operational currents of the seventh current source and the eighth current source are different from each other.

9. The logic circuit of claim 8, wherein the third switching control module further comprises:

a ninth current source, one end of the ninth current source connected to the buck control module via a ninth control switch, another end of the ninth current source connected to the first end of the third switch component, wherein the operational current of the ninth current source is different from the operational currents of both the seventh current source and the eighth current source.

10. The logic circuit of claim 9, wherein the voltage adjusting module corresponding to the third switch component and the fourth switch component is a buck module, the buck module has a second voltage input end and a second voltage output end, and the buck module comprises:

a second inductor, one end of the second inductor connected to the third end of the second switch component and the second end of the third switch component, the other end of the second inductor connected to the second voltage output end, and the second end of the second switch component connected to the second voltage input end, the third end of the third switch component being grounded;

a second capacitor, a first electrode plate of the second capacitor connected to the other end of the second inductor, a second electrode plate of the second capacitor being grounded.

11. A display panel, comprising a logic circuit, which comprises:
    a voltage adjusting control module;
    a switching control module, one end of the switching control module connected in series with the voltage adjusting control module;
    a voltage adjusting module, comprising a switch component, another end of the switching control module connected in series with the switch component,
    wherein the switching control module connected in series with the same switch component has at least two different operational currents for a corresponding switch component to have different switching speeds.

12. The display panel of claim 11, wherein the switching control module connected in series with the same switch component comprises at least two current sources connected in parallel to each other, one end of each current source is connected to the voltage adjusting control module via a control switch, and another end of each current source is connected to a corresponding switch component, wherein the operational currents of the current sources are different from each other.

13. The display panel of claim 12, wherein the voltage adjusting control module comprises a boost control module, the switching control module connected to the boost control module is a first switching control module, the switch component connected to the first switching control module is a first switch component, wherein the first switching control module comprises:
    a first current source, one end of the first current source connected to the boost control module via a first control switch, another end of the first current source connected to a first end of the first switch component;
    a second current source, one end of the second current source connected to the boost control module via a second control switch, another end of the second current source connected to the first end of the first switch component,
    wherein the operational currents of the first current source and the second current source are different from each other.

14. The display panel of claim 13, wherein the voltage adjusting module corresponding to the first switch component is a boost module, the boost module has a first voltage input end and a first voltage output end, and the boost module comprises:
    a first inductor, one end of the first inductor connected to the first voltage input end, the other end of the first inductor connected to a second end of the first switch component, a third end of the first switch component being grounded;
    a diode, a positive electrode of the diode connected to the other end of the first inductor, a negative electrode of the diode connected to the first voltage output end;
    a first capacitor, a first electrode plate of the first capacitor connected to the negative electrode of the diode, a second electrode plate of the first capacitor being grounded.

15. The display panel of claim 14, wherein the first switching control module further comprises:
    a third current source, one end of the third current source connected to the boost control module via a third control switch, another end of the third current source connected to the first end of the first switch component,
    wherein the operational current of the third current source is different from the operational currents of both the first current source and the second current source.

16. The display panel of claim 15, wherein the voltage adjusting control module comprises a buck control module, the switching control module connected to the buck control module comprises a second switching control module and a third switching control module, the switch component connected to the second switching control module is a second switch component, the switch component connected to the third switching control module is a third switch component, wherein the second switching control module comprises:
    a fourth current source, one end of the fourth current source connected to the buck control module via a fourth control switch, another end of the fourth current source connected to the first end of the second switch component;
    a fifth current source, one end of the fifth current source connected to the buck control module via a fifth control switch, another end of the fifth current source connected to the first end of the second switch component,
    wherein the operational currents of the fourth current source and the fifth current source are different from each other.

17. The display panel of claim 16, wherein the second switching control module further comprises:
    a sixth current source, one end of the sixth current source connected to the buck control module via a sixth control switch, another end of the sixth current source connected to the first end of the second switch component,
    wherein the operational current of the sixth current source is different from the operational currents of both the fourth current source and the fifth current source.

18. The display panel of claim 17, wherein the third switching control module comprises:
    a seventh current source, one end of the seventh current source connected to the buck control module via a seventh control switch, another end of the seventh current source connected to the first end of the third switch component;
    an eighth current source, one end of the eighth current source connected to the buck control module via an eighth control switch, another end of the eighth current source connected to the first end of the third switch component,
    wherein the operational currents of the seventh current source and the eighth current source are different from each other.

19. The display panel of claim 18, wherein the third switching control module further comprises:
    a ninth current source, one end of the ninth current source connected to the buck control module via a ninth control switch, another end of the ninth current source connected to the first end of the third switch component,
    wherein the operational current of the ninth current source is different from the operational currents of both the seventh current source and the eighth current source.

20. The display panel of claim 19, wherein the voltage adjusting module corresponding to the third switch component and the fourth switch component is a buck module, the buck module has a second voltage input end and a second voltage output end, and the buck module comprises:

a second inductor, one end of the second inductor connected to the third end of the second switch component and the second end of the third switch component, the other end of the second inductor connected to the second voltage output end, and the second end of the second switch component connected to the second voltage input end, the third end of the third switch component being grounded;

a second capacitor, a first electrode plate of the second capacitor connected to the other end of the second inductor, a second electrode plate of the second capacitor being grounded.

* * * * *